(12) United States Patent
Grindstaff (10) Patent No.: US 7,062,669 B2
(45) Date of Patent: Jun. 13, 2006

(54) SYSTEM FOR CORRELATING CLOCK FLIGHT TIMES AND METHOD OF USING

(75) Inventor: Marcus A. Grindstaff, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 499 days.

(21) Appl. No.: 10/177,212

(22) Filed: Jun. 21, 2002

(65) Prior Publication Data

US 2003/0237015 A1   Dec. 25, 2003

(51) Int. Cl.
*G06F 1/10* (2006.01)
(52) U.S. Cl. .......................... 713/500; 326/93; 375/354
(58) Field of Classification Search ................ 713/375, 713/400, 500, 503, 600
See application file for complete search history.

(56) References Cited

U.S. PATENT DOCUMENTS

| | | | | |
|---|---|---|---|---|
| 5,296,748 A | * | 3/1994 | Wicklund et al. | 327/565 |
| 5,967,796 A | * | 10/1999 | Hartfiel et al. | 439/61 |
| 6,591,372 B1 | * | 7/2003 | Nerl | 713/503 |
| 6,618,816 B1 | * | 9/2003 | Ido et al. | 713/503 |

* cited by examiner

*Primary Examiner*—Lynne H. Browne
*Assistant Examiner*—Anand B. Patel
(74) *Attorney, Agent, or Firm*—Schwegman, Lundberg, Woessner & Kluth, P.A.

(57) ABSTRACT

A system correlates clock signal flight times between a device on a board and a device on a card that is coupled to the board. A board device first trace runs from a clock driver on the board to the card. A board device second trace runs back to the board device.

29 Claims, 5 Drawing Sheets

SYSTEM FOR CORRELATING CLOCK FLIGHT TIMES AND METHOD OF USING

TECHNICAL FIELD

Embodiments of the present invention relate to data processing and more specifically to board and card systems and methods for establishing correlated clock flight time relationships between a board device and a card device from a clock signal that originates at a clock driver.

BACKGROUND INFORMATION

Description of Related Art

In a computer system and other electronic systems, a clock driver generates clock signals to allow various devices to operate in concert with each other. A "flight time" of the clock signal is the period between the generation of a given pulse at the clock driver and its arrival at a device that is taking its timing queue from the clock driver.

One of the issues encountered when using add-in cards in a computer system is correlating the clock signal flight time to a device on the main board of the computer system and the clock signal flight time to a device on an add-in card that is coupled to the main board. Because the exact flight times are difficult to predict, it is often challenging for a system designer to achieve equal flight times between the clock generator driver and a device on the main board, and the clock generator driver and a device on an add-in card. As clock interfaces become faster and as asynchronous components are departed from in favor of synchronous components, it is important to match flight times in order to avoid detrimental skew and to improve the timing margin.

Figure 1:
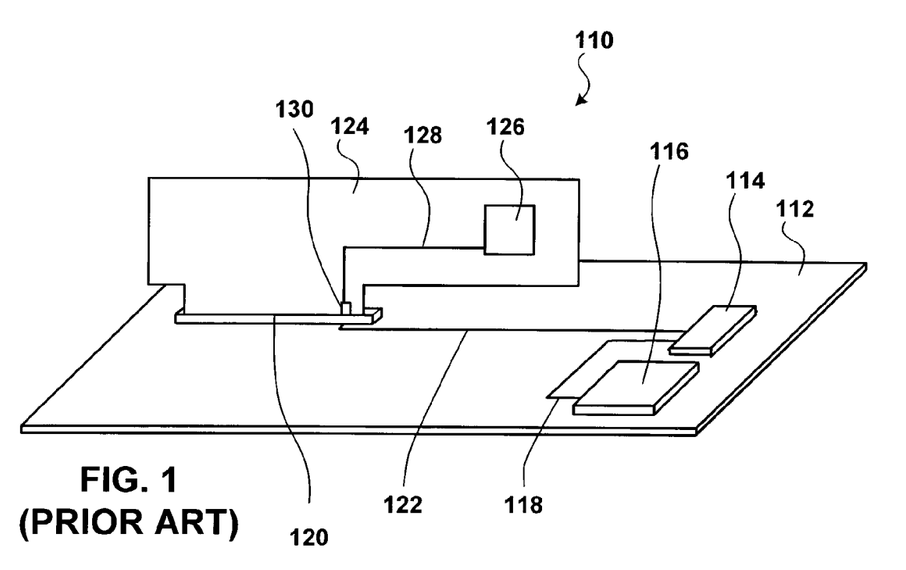
FIG. 1 is a perspective view of an existing board and expansion card system.

FIG. 1 is a perspective view of an existing system 110 that includes a main or motherboard 112, a clock driver 114 disposed thereon, and a board device 116. The clock driver 114 and the board device 116 are connected by a board trace 118 that has a board trace length. The system 110 also includes an expansion slot 120, also referred to as a card slot 120, and a card trace 122 that has a card trace length. Additionally, a card 124 is disposed in the card slot 120, and a card device 126 is disposed thereon. A terminal trace 128 completes an electrical coupling to the card device 126 between a card terminal 130 and the card device 126. The terminal trace 128 has a terminal trace length.

For the flight times to be effectively equal, it is true that the flight time along the board trace 118 must be equal to flight time along the card trace 122 plus the flight time along the terminal trace 128. This equality produces the highest timing margin. The existing limitation is that the main board 112 is only designed for a card with a flight time of the terminal trace 128. If the flight time is changed for any variety of cards, due to design rules for the card or design rules for the board, the main board 112 must be modified or the margin is reduced. Modification of the main board 112 is often not possible.

BRIEF DESCRIPTION OF THE DRAWINGS

In order to illustrate the manner in which embodiments of the present invention are obtained, a more particular description of the invention briefly described above will be rendered by reference to specific embodiments thereof which are depicted in the appended drawings. Understanding that these drawings depict only typical embodiments of the invention that are not necessarily drawn to scale and are not therefore to be considered limiting of its scope, embodiments will be described and explained with additional specificity and detail through the use of the accompanying drawings in which.

DETAILED DESCRIPTION

One aspect of the present invention relates to a system that includes a main board and an add-in device. Another aspect relates to a method of establishing a clock signal flight time for the board device that is a known relationship to a clock signal flight time for the add-in device. Typically, the desired clock signal flight time relationship is substantially equal, or it is a known skew.

The following description includes terms, such as upper, lower, first, second, etc. that are used for descriptive purposes only and are not to be construed as limiting. The embodiments of a device or article of the present invention described herein can be manufactured, used, dr shipped in a number of positions and orientations. The terms "die" and "processor" generally refer to the physical object that is the basic workpiece that is transformed by various process operations into the desired integrated circuit device. A clock driver, a board device, and a card device are each typically a packaged die made of semiconductive material that has been singulated from a wafer after integrated processing. Wafers may be made of semiconducting, non-semiconducting, or combinations of semiconducting and non-semiconducting materials.

Reference will now be made to the drawings wherein like structures will be provided with like reference designations. In order to show the structures of the present invention most clearly, the drawings included herein are diagrammatic representations of articles. Thus, the actual appearance of the fabricated structures, for example in a photograph, may appear different while still incorporating the essential structures. Moreover, the drawings show only the structures necessary to understand the various embodiments. Additional structures known in the art have not been included to maintain the clarity of the drawings.

Figure 2:
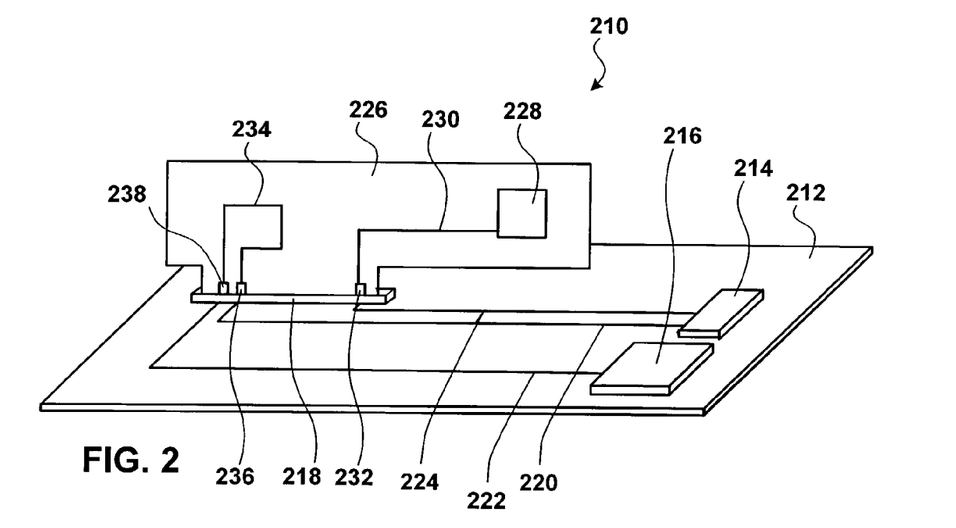
FIG. 2 is a perspective view of a board and expansion card system according to an embodiment.

FIG. 2 is a perspective view of a board and expansion card system according to an embodiment. The system 210 includes a board 212 such as a motherboard, a main board, or the like, a clock driver 214, and a board device 216 disposed thereon. The system 210 further includes an expansion slot 218, a board device first trace 220 disposed on the board 212 between the clock driver 214 and the expansion slot 218, and a board device second trace 222 disposed on the board 212 between the expansion slot 218 and the board device 216. Additionally, a card device trace 224 is disposed on the board 212 between the clock driver 214 and the expansion slot 218.

In addition to the board 212 and structures disposed thereon, a card 226 is disposed in the expansion slot 218. The card 226 includes a card device 228 disposed thereon. The card device 228 is electrically coupled to the clock driver 214. Accordingly, communication between the clock driver 214 and the card device 228 is completed on the card 226 by a terminal trace 230, disposed between a card device connector 232 and the card device 228.

The board device 216 is electrically coupled to the clock driver 214. Accordingly, a board device loop 234 is disposed on the card 226 between a CLKIN connector 236 and a CLKOUT connector 238.

In another embodiment, the board 212 alone, along with the structures disposed thereon constitute a board system. The board system includes the board 212, the clock driver 214, the board device 216, and the expansion slot 218. Additionally, the board system includes the board device first trace 220 between the clock driver 214 and the expansion slot 218. The board system further includes the board device second trace 222 between the expansion slot 218 and the board device 216. The board system further includes the card device trace 224 between the clock driver 214 and the expansion slot 218. If no expansion card is used, a "dummy card" (not pictured) is insertable into the expansion slot 218 to complete the electrical coupling between the CLKIN connector 236 and the CLKOUT connector 238.

The board system embodiment is connectable to a card system embodiment. Thereby, the board system operates with a CLKIN signal that propagates along the board device first trace 220 away from the clock driver 214, and with a CLKOUT signal that propagates along the board device second trace 222, toward the board device 216. According to this embodiment, the CLKOUT signal is a continuation of the CLKIN signal that may have been subjected to a delay while on the card 226.

In another embodiment, the board system includes a card system as illustrated in FIG. 2. The card system is electrically coupled and physically connected to the board system at the expansion slot 218. The card system includes the expansion card 226 and the card device 228. The card system further includes the terminal trace 230 disposed between the card device connector 232 and the card device 228. The card system also includes the board device loop 234 between the CLKIN connector 236 and the CLKOUT connector 238.

Although the board system and the card system can be separate systems that can be manufactured by separate business entities, the board system and the card system can be combined. In any event, the card system includes the board device loop 234 that in a more general embodiment, is a remote device loop, and the remote device, such as the board device 216, can be on a motherboard or on a main board of another article such as a board for a parallel processing system.

Similar to the flight time relationships that exist on the board system, the card system in various embodiments has a clock signal that propagates along the terminal trace 230 with a flight time that is substantially equal to a clock signal with a flight time that propagates along the remote device loop 234. In another embodiment, the flight time relationship includes at least one skew.

In some embodiments, it is useful to include a skew in the clock driver 214. The skew is used for the board device 216, and the clock driver 214 includes the functionality to generate a skewed signal along the board device first trace 220, the board device loop 234, and the board device second trace 222. In one embodiment where a skew is employed, the skew is tunable to the system that is presented. For example, a given board system with a clock driver and board device is connected to a card system with a card device. The clock driver includes a feedback capability from both the board device and the card device. The feedback capability allows the skew to be tunable according to a specific application. In another embodiment, the skew is calculated to cause the flight times between the clock driver and the board device, and between the clock driver and the card device, to be substantially equal. In another embodiment, the skew is calculated to cause the flight times between the clock driver and the board device, and the clock driver and the card device, to have at least one skew such as a positive skew or a negative skew.

The system embodiments include a plurality of subsystem embodiments. One subsystem embodiment includes the board device subsystem. Another subsystem embodiment includes the card device subsystem. Accordingly, the board device subsystem and the card device subsystem create a flight time relationship between the clock driver 214 and the respective board device 216 and card 228 device. In one embodiment, the flight time relationship is substantially equal. In another embodiment, the flight time relationship is at least one skew.

Figure 3:
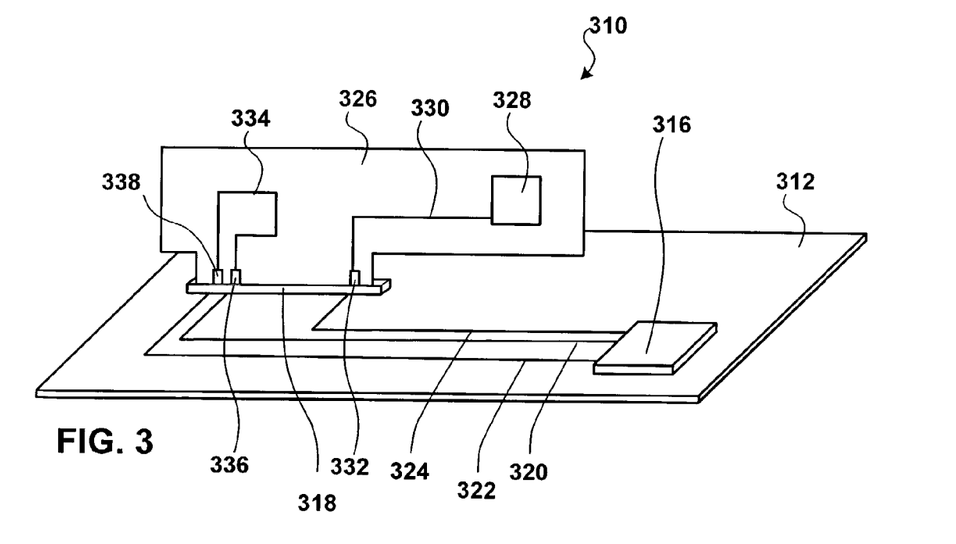
FIG. 3 is a perspective view of another board and expansion card system according to an embodiment.

FIG. 3 is a perspective view of another board and expansion card system according to an embodiment. In some embodiments, the system can be constructed to include the clock driver in the board device. FIG. 3 depicts this construction. The system 310 includes a board 312 such as a motherboard, a main board, or the like, and a clock driver-containing board device 316 disposed thereon. The system 310 further includes an expansion slot 318, a board device first trace 320 disposed on the board 312 between the clock driver-containing board device 316 and the expansion slot 318, and a board device second trace 322 disposed on the board 312 between the expansion slot 318 and the board device 316. Additionally, a card device trace 324 is disposed on the board 312 between the clock driver-containing board device 316 and the expansion slot 318.

In addition to the board 312 and structures disposed thereon, a card 326 is both electrically coupled and physically connected to the board 312 at the expansion slot 318. The card 326 includes a card device 328 disposed thereon. The card device 328 is electrically coupled to the clock driver in the board device 316. Therefore, communication between a clock driver in the board device 316 and the card device 328 is completed on the card 326 by a terminal trace 330 disposed between a card device connector 332 and the card device 328. The board device clock driver and the board device are electrically coupled. Accordingly, a board device loop 334 is disposed between a CLKIN connector 336 and a CLKOUT connector 338. This embodiment also includes a distinct board system and a distinct card system that are similar to embodiments of the system(s) as described herein, and as depicted in FIG. 2.

Figure 4:
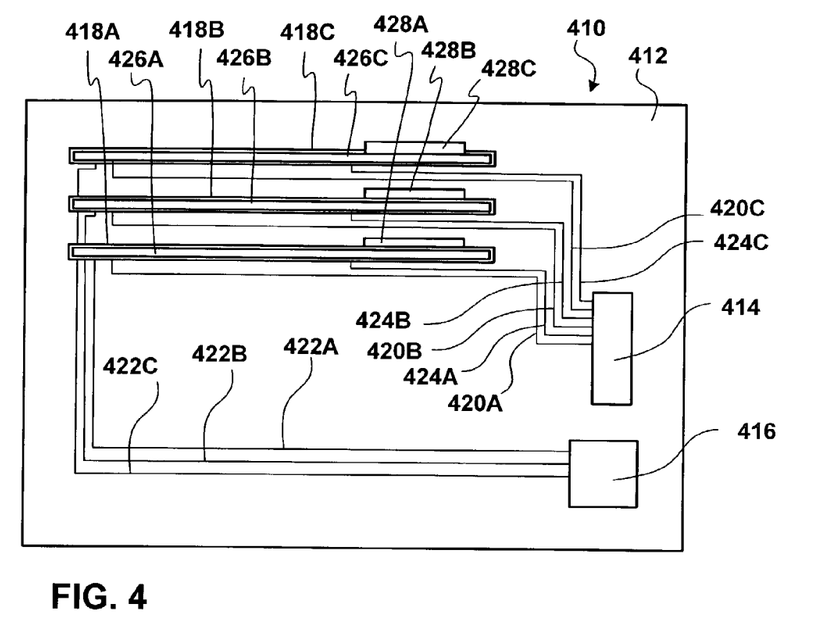
FIG. 4 is a top plan of a board and expansion card system according to an embodiment.

FIG. 4 is a top plan of a board and expansion card system according to an embodiment. The board is a receptacle for a plurality of cards. A system 410 includes a board 412 that includes a plurality of cards. In this embodiment, three cards are depicted, but more or less can be implemented. The board 412 includes a clock driver 414 and a board device 416. In one embodiment, the clock driver 414 includes a plurality of clock driver circuits for each of the expansion slots.

A plurality of expansion slots 418A, 418B, and 418C is depicted but more or less can be implemented. A board device first trace 420A is disposed on the board 412 between the clock driver 414 and the expansion slot 418A, and a board device second trace 422A is disposed on the board 412 between the expansion slot 418A and the board device 416. Additionally, a card device trace 424A is disposed on the board 412 between the clock driver 414 and the expansion slot 418A.

Similarly, a board device first trace 420B is disposed on the board 412 between the clock driver 414 and the expansion slot 418B, and a board device second trace 422B is disposed on the board 412 between the expansion slot 418B and the board device 416. Additionally, a card device trace 424B is disposed on the board 412 between the clock driver 414 and the expansion slot 418B. Also for this embodiment, a board device first trace 420C is disposed on the board 412 between the clock driver 414 and the expansion slot 418C, and a board device second trace 422C is disposed on the board 412 between the expansion slot 418C and the board device 416. Additionally, a card device trace 424C is disposed on the board 412 between the clock driver 414 and the expansion slot 418C.

In addition to the board 412 and structures disposed thereon, cards 426A, 426B, and 426C are disposed in the respective expansion slots 418A, 418B, and 418C. The cards 426A, 426B, and 426C include respective card devices 428A, 428B, and 428C disposed thereon.

Where there can be an expansion slot and no card device, a dummy card (not pictured) is insertable in the expansion slot to close the electrical coupling between the clock generator and the board device. Some structures referenced in FIG. 4 are not visible as illustrated. Communication between the clock driver 414 and a card device 428 is completed by a terminal trace (not pictured) disposed between a card device connector (not pictured) and the card device 428. Additionally, a board device loop (not pictured) is disposed between a CLKIN connector (not pictured) and a CLKOUT connector (not pictured) for each card.

According to this example, the system includes the card device trace 424, disposed on the board 412 between the clock driver 414 and the expansion slot 418. The system also includes a first plurality of card device traces 424A, 424B, and 424C. The card is one of a plurality of cards 426A, 426B, and 426C that correspond to the first plurality of card device traces 424A, 424B, and 424C.

Although not depicted, the system illustrated in FIG. 4, can be modified to an embodiment that combines the trace layout of FIG. 4 with the integrated clock driver board device of FIG. 3. This embodiment includes a single board device that contains the plurality of clock driver(s) within the board device, similar to the embodiment depicted in FIG. 3, but for a plurality of cards similar to the embodiment depicted in FIG. 4.

Figure 5:
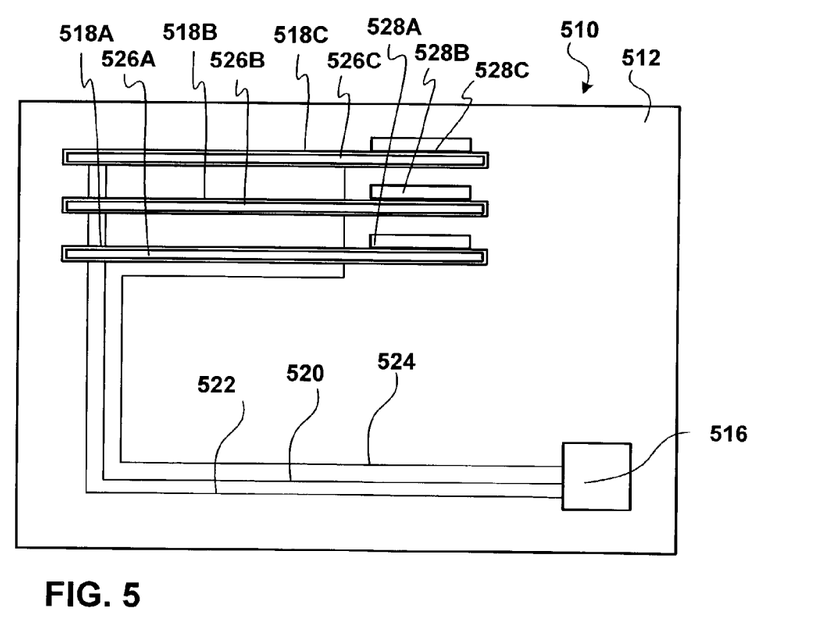
FIG. 5 is a top plan of another board and expansion card system according to an embodiment.

FIG. 5 is a top plan of another board and expansion card system according to an embodiment. In this embodiment, a bus is employed to reduce the number of traces on the board. FIG. 5 illustrates a top plan of a system that is similar to the system depicted in FIG. 4, but with the single board device that includes the clock driver(s) within the board device, similar to the embodiment depicted in FIG. 3. In other words, in this system, the board device first trace and the board device second trace are each part of a bus that is connected to the expansion slots. Further, a plurality of cards is connected to the bus.

The board 512 includes a clock driver-containing board device 516. In one embodiment, the clock driver includes a plurality of clock driver circuits for each of the plurality of cards.

A plurality of expansion slots 518A, 518B, and 518C is provided, but more or less can be implemented. A board device first trace 520 is disposed on the board 512 between the board device 516 and the expansion slots 518A, 518B, and 518C. A board device second trace 522 is disposed on the board 512 between the expansion slots 518A, 518B, and 518C and the board device 516. Additionally, a card device trace 524 is disposed on the board 512 between the board device 516 and the expansion slots 518A, 518B, and 518C. In one embodiment, a bus is formed by bundling the board device first trace 520, the board device second trace 522, and the card device trace 524. In one embodiment, a bus is formed by bundling the board device first trace 520, the board device second trace 522, but not the card device trace 524. Optionally, other traces such as control and data traces are also bundled with the board and/or card device traces.

Although not illustrated, another embodiment includes a bus similar to the embodiment depicted in FIG. 5, but the clock driver and the board device are separate components similar to the arrangement of the clock driver 414 and the board device 416 depicted in FIG. 4. In one embodiment, the bus does not include the card device trace 524.

In addition to the board 512 and structures disposed thereon, cards 526A, 526B, and 526C are disposed in the respective expansion slots 518A, 518B, and 518C but more or less can be implemented. If less, a dummy card (not pictured) is insertable into an open expansion slot to electrically couple the clock driver to the board device 516. In this embodiment the cards 526A, 526B, and 526C include respective card devices 528A, 528B, and 528C.

Some structures referenced in FIG. 5 are not visible as illustrated. In reference to the structures depicted in FIG. 5, communication between the clock driver and the card devices is completed by a terminal trace (not pictured) disposed between a given card device connector (not pictured) and the corresponding card device. Additionally, a board device loop (not pictured) is disposed between a given CLKIN connector (not pictured) and a CLKOUT connector (not pictured) for each card.

Similarly to the previous embodiments for the clock driver, the clock driver is either stand-alone or it is integrated into the board device. One embodiment includes a plurality of clock driver circuits for each of the card devices. Additionally, the plurality of cards can be organized on a board by a data and control bus such as is depicted in FIG. 5, or by dedicated data and control traces such as is depicted in FIG. 4.

Figure 6:
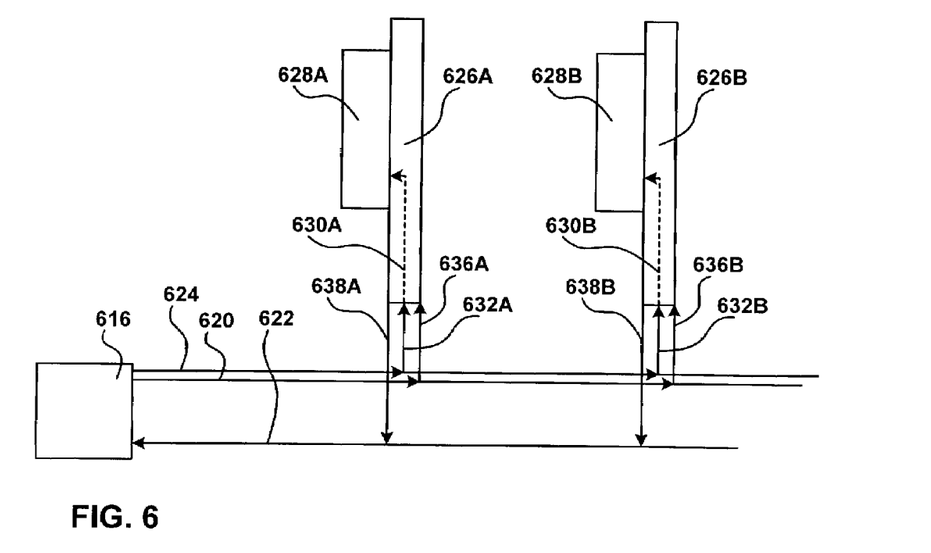
FIG. 6 is a partial schematic elevation of a multiple-card arrangement according to an embodiment.

FIG. 6 is a schematic elevation of a multiple-card arrangement according to an embodiment. FIG. 6 is a partial schematic of a multi-drop, clock signal system for a plurality of cards. This embodiment illustrates the connection along a bus for a board device loop on each of the plurality of cards. The card device trace 624 leads to a card device connector 632A and onto a terminal trace 630A. The card device trace 624 also leads to another card device connector 632B and onto another terminal trace 630B.

A board device 616 is depicted with an integrated clock driver circuit, by way of non-limiting example. According to another embodiment, a separate clock driver circuit is disposed in the board device 616, for each of the plurality of expansion cards. The clock driver circuit is integrated in the board device 616, but it could be a stand-alone device connected to a board device first trace 620 that joins a control and data bus.

A card 626A and a card device 628A are depicted as part of a first card system. Another card 626B and a card device 628B are depicted as part of a second card system. A board device first trace 620 forms part of a control and data bus, and makes contact with CLKIN portions 636A and 636B of the respective board device loops. A board device second trace 622 forms another part of the control and data bus, and makes contact with CLKOUT portions 638A and 638B of the respective board device loops. The card device trace 624 forms another part of the control and data bus.

Figure 7:
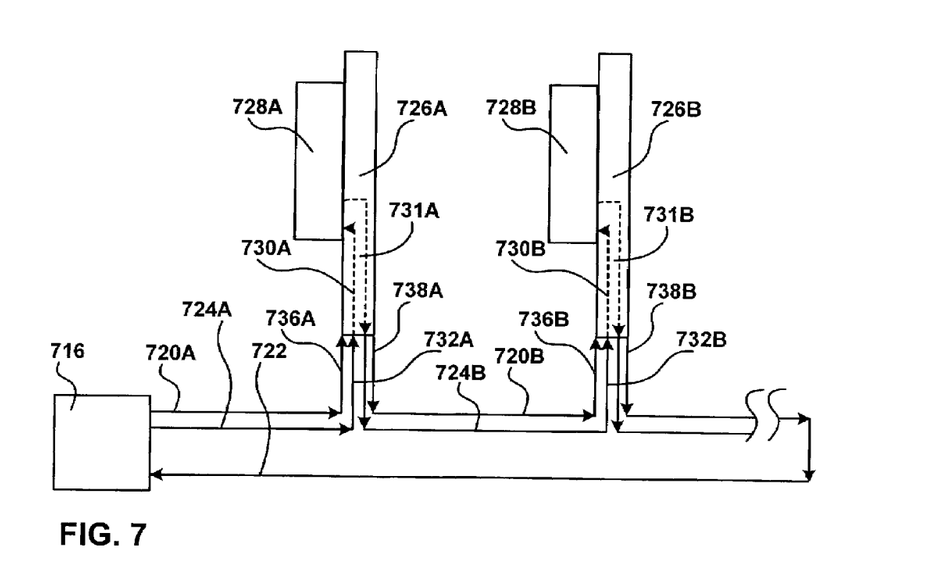
FIG. 7 is a partial schematic elevation of a multiple-card arrangement according to an embodiment.

FIG. 7 is a partial schematic elevation of a multiple-card arrangement according to an embodiment. FIG. 7 depicts a point-to-point ring, virtual multi-drop, system for a plurality of cards. This embodiment illustrates the connection along a bus for a board device loop on each of the plurality of cards. A card device first trace 724A leads to a card device connector 732A and onto a terminal trace 730A. A card device second trace 724A also leads to a card device connector 732B and onto a terminal trace 730B. A terminal trace return 731A leads to a card device connector return 733A in this point-to-point configuration. Similarly, a terminal trace return 731B leads to a card device connector return 733B. The point-to-point configuration requires more pins that the multi-drop configuration. However, in an alternative embodiment, the terminal trace can be a multi-drop scheme as depicted in FIG. 6. In other words, the clock signal passes from the clock driver to the board device through a point-to-point configuration, but the clock signal passes to the card devices in a multi-drop scheme.

A board device 716 is depicted with an integrated clock driver. A card 726A and a card device 728A are depicted as part of a first card system. Another card 726B and a card device 728B are depicted as part of a second card system. An empty expansion slot is filled with a "dummy" card that closes the circuit in lieu of a board device loop.

A board device first trace 720A forms part of a control and data bus, and makes contact with the CLKIN portion 736A of the board device loop that is part of the first card system. A board device first trace 720B forms part of the control and data bus, and makes contact with the CLKOUT portion 738A of the board device loop that is part of the first card system, and with the CLKIN portion 736B of the board device loop that is part of the second card system. The board device second trace 722 forms another part of the control and data bus, and in this embodiment, makes contact with CLKOUT portion 738B of the board device loop on the card 726B. According to one embodiment, a separate clock driver is disposed in the board device 716, for each of the plurality of expansion cards.

In some embodiments, the board system has a distinct clock signal flight time relationship between the flight time exhibited along the board device first and second traces, and the flight time exhibited along the card device trace. In one embodiment, it is useful for the flight time relationship to be substantially equal. By "substantially equal" it is noted that respective clock lengths are within at least about plus or minus 1% of each other, based upon the period of the signal waveform. In one embodiment, it is useful for the flight time relationship to be skewed by a selected skew. In one embodiment, the skew for the different flight times is greater than about plus or minus 1% of each other. In another embodiment, the skew for the different flight times is less than about plus or minus 5% of each other. In another embodiment, the skew difference for the different flight times is less than about plus or minus 10% of each other.

In some embodiments, it is preferred to have a skew in one system that must be undone in the connected system. According to various embodiments, skew of the clock signal flight times may be done, either plus or minus on the board and on the card(s). In other words, an intentional skew on the board is required, but the card(s) is designed to undo the board skew. For example, there can be a plus 5 nanosecond skew on the board, and a minus 5 nanosecond skew on the card. Similarly, where there is an expected clock skew on the card(s), there can be a reverse clock skew on the board to undo the clock skew on the card(s).

Skew is sometimes implemented in a single-directional interface where the clock at the driver leads the clock at the receiver. Additionally, two devices can be laid out in silicon and in packaging that have disparate timing requirements, such as a larger set-up than hold timing for one device than for the other device. A clock skew may be therefore implemented to get a stable timing margin.

Figure 8:
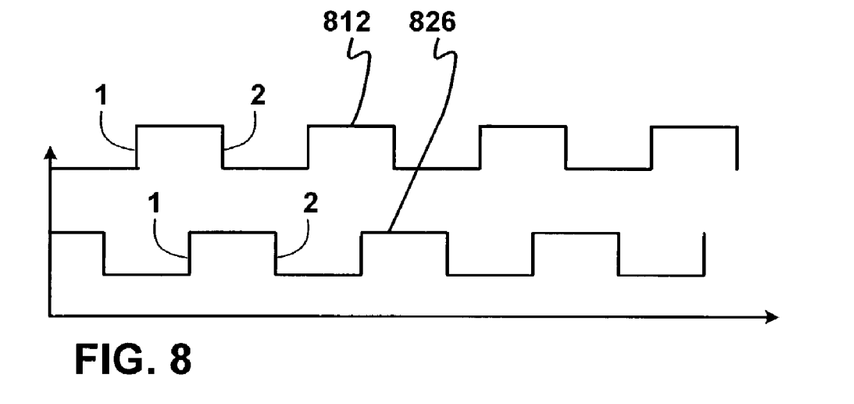
FIG. 8 is a waveform diagram according to an embodiment.

FIG. 8 is a waveform diagram according to an embodiment. In one embodiment, the skew of the clock signal flight time on the board may lead the clock signal flight time on the card. This board-leading-card skew is a positive skew. FIG. 8 illustrates a board signal 812 and a card signal 826 in a positive skew mode. The board signal 812 and the card signal 826 are each denoted by leading edges "1" and trailing edges "2". In FIG. 8 the board signal 812 leading edge is in front of the leading edge of the card signal 826.

Figure 9:
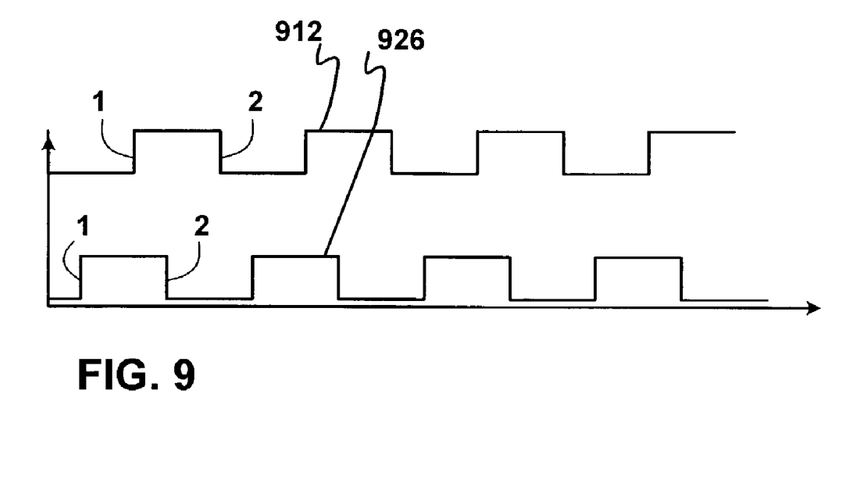
FIG. 9 is a waveform diagram according to an embodiment.

FIG. 9 is a waveform diagram according to an embodiment. In one embodiment, the skew of the clock signal flight time on the card may lead the clock signal flight time on the board. This card-leading-board skew is a negative skew. FIG. 9 illustrates a board signal 912 and a card signal 926 in which the leading edge of the card signal 912 is in front of the leading edge of the board signal 912.

Another embodiment includes a method that correlates clock signal flight times between a board device and a card device. Reference may be made to the system depicted in FIG. 2, by way of non-limiting example, although other systems may be used in the method embodiments. The method includes establishing a clock signal flight time relationship between a board device 216 and a card device 228. For the board device 216, the clock signal flight time is related to the flight time of a clock signal between a clock driver 214 on the board 212, the board loop 234 on the card 226, and the board device 216. For the card device 228, the clock signal flight time is related to the flight time of a clock signal between the clock driver 214 on the board 212, the terminal trace 230, and the card device 228. In one embodiment, the relationship is that the clock signal flight times on the board 212 are substantially equal.

In a first relationship, the board device loop 234 clock signal flight time and the terminal trace 230 clock signal flight time are substantially equal, and the card device trace 224 clock signal flight time is substantially equal to the sum of the board device first trace 220 clock signal flight time and the board device second trace 222 clock signal flight time.

In another relationship, the board device loop 234 flight time is proportional to the terminal trace 230 flight time, and the card device trace 224 flight time is substantially equal to the sum of the board device first trace 220 flight time and the board device second trace 222 clock signal flight time. The proportionality is a known positive or negative skew.

In another relationship, the board device loop 234 clock signal flight time is substantially equal to the terminal trace 230 clock signal flight time, and the card device trace 224 clock signal flight time is proportional to the sum of the board device first trace 220 clock signal flight time and the board device second trace 222 clock signal flight time. The proportionality is a positive or negative skew.

In another relationship, the board device loop 234 clock signal flight time is proportional to the terminal trace 230 clock signal flight time, and the card device trace 224 clock signal flight time is proportional to the sum of the board device first trace 220 clock signal flight time and the board device second trace 222 clock signal flight time. The proportionality is a positive or negative skew or delay. For example, the board can have a positive skew due to some design rule reasons, and the card can have a negative skew to neutralize the positive skew on the board.

It is emphasized that the Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

In the foregoing Detailed Description, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the Detailed Description of Embodiments of the Invention, with each claim standing on its own as a separate embodiment.

It will be readily understood to those skilled in the art that various other changes in the details, material, and arrangements of the parts and method stages which have been described and illustrated in order to explain the nature of this invention may be made without departing from the principles and scope of the invention as expressed in the subjoined claims.

What is claimed is:

1. A system comprising:
    a board, and on the board: a clock driver; a board device; an expansion slot; a board device first trace between the clock driver and the expansion slot; a board device second trace between the expansion slot and the board device; and a card device trace between the clock driver and the expansion slot; and
    a card at the expansion slot, and on the card: a CLKIN connector; a CLKOUT connector; a board device loop between the CLKIN connector and the CLKOUT connector; a card device connector; a card device; and a terminal trace between a card device connector and the card device.

2. The system according to claim 1, wherein the clock driver includes a skew for the board device to generate a skewed signal along the board device first trace, the board device loop, and the board device second trace.

3. The system according to claim 1, wherein the clock driver includes a skew for the board device to generate a skewed signal along the board device first trace, the board device loop, and the board device second trace, and wherein the skewed signal is tunable to the system.

4. The system according to claim 1, wherein the clock driver includes a skew for the board device to generate a skewed signal along the board device first trace, the board device loop, and the board device second trace, wherein the skewed signal is tunable to the system, and wherein the skewed signal creates a clock signal flight time relationship between the board device and the card device, wherein the clock signal flight time relationship comprises one of substantially equal, and at least one skew.

5. The system according to claim 1, wherein the card device trace is one of a first plurality of card device traces, and wherein the card is one of a second plurality of cards that corresponds to the first plurality of card device traces, wherein the second plurality is less than or equal to the first plurality.

6. The system according to claim 1, the system further including:
    a bus on the board between the clock driver and the expansion slot, wherein the board device first trace and the board device second trace are part of the bus.

7. The system according to claim 1, wherein the expansion slot is one of a first plurality of expansion slots, the system further including:
    a bus on the board between the clock driver and the first plurality of expansion slots, wherein the board device first trace and the board device second trace are part of the bus, and wherein the card is one of a second plurality of cards coupled to the bus wherein the second plurality is less than or equal to the first plurality.

8. The system according to claim 1, wherein the expansion slot is one of a first plurality of expansion slots, wherein the clock driver is one of a first plurality of clock drivers, and wherein the first plurality of clock drivers is in the board device, the system further including:
    a bus on the board between the board device and the first plurality of expansion slots, wherein the board device first trace and the board device second trace are part of the bus.

9. The system according to claim 1, wherein the expansion slot is one of a first plurality of expansion slots, wherein the clock driver is one of a plurality of clock drivers, and wherein the plurality of clock drivers is in the board device, the system further including:
    a bus on the board between the board device and the first plurality of expansion slots, wherein the board device first trace and the board device second trace are part of the bus, and wherein the card is one of a second plurality of cards connected to the bus, wherein the second plurality is less than or equal to the first plurality.

10. A board system, comprising:
    a board, and on the board:
        a clock driver;
        a board device;
        an expansion slot;
        a board device first trace between the clock driver and the expansion slot;
        a board device second trace between the expansion slot and the board device;
        a card device trace between the clock driver and the expansion slot; and
        an insert in the expansion slot to couple the board device first trace to the board device second trace.

11. The board system according to claim 10, the board system further including:
    a CLKIN signal that propagates along the board device first trace, away from the clock driver; and
    a CLKOUT signal that propagates along the board device second trace, toward the board device, wherein the CLKOUT signal is a continuation of the CLKIN signal.

12. The board system according to claim 10, wherein the clock driver is contained within the board device.

13. The board system according to claim 10, the board system further including:
a board device signal that propagates along the board device first and second traces;
a card device signal that propagates along the card device trace, wherein the board device signal and the card device signal have a flight time relationship comprising one of substantially equal, and at least one skew.

14. The board system according to claim 10, the board system further including:
a card at the expansion slot, and on the card:
a CLKIN connector;
a CLKOUT connector;
a board device loop between the CLKIN connector and the CLKOUT connector;
a card device connector;
a card device; and
a terminal trace between a card device connector and the card device.

15. A card system comprising:
an expansion card including a card device disposed thereon;
a terminal trace on the expansion card, between a card device connector and the card device;
a CLKIN connector and a CLKOUT connector;
a remote device loop on the expansion card between the CLKIN connector and the CLKOUT connector.

16. The card system according to claim 15, wherein the remote device loop includes a loop for a board device.

17. The card system according to claim 15, the card system further including a board, and on the board:
a clock driver; a board device; an expansion slot coupled to the card; a board device first trace between the clock driver and the expansion slot; a board device second trace between the expansion slot and the board device; and a card device trace between the clock driver and the expansion slot.

18. The card system according to claim 15, wherein a clock signal that propagates along the terminal trace has a flight time in relationship to a signal that propagates along the remote device loop, wherein the flight time relationship comprises one of substantially equal, and at least one skew.

19. A system comprising:
a board, and on the board: a clock driver; a board device; a first plurality of expansion slots; a board device first trace between the clock driver and the first plurality of expansion slots; a board device second trace between the first plurality of expansion slots and the board device; and a card device trace between the clock driver and the first plurality of expansion slots;
a second plurality of cards at the first plurality of expansion slots, and on each of the second plurality of cards: a CLKIN connector; a CLKOUT connector; a board device loop between the CLKIN connector and the CLKOUT connector; a card device connector; a card device; and a terminal trace between a card device connector and the card device; and
wherein the clock driver and the board device are configured comprising one of two discrete components and an integrated unit, and wherein the second plurality is less than or equal to the first plurality.

20. The system according to claim 19, the system further including:
a bus between the clock driver and the first plurality of expansion slots, wherein the bus and the first plurality of expansions slots are configured comprising one of a multi-drop configuration and a point-to-point ring configuration.

21. The system according to claim 19, wherein the clock driver includes a skew for the board device to generate a skewed signal along the board device first trace, the board device loop, and the board device second trace, wherein the skewed signal is tunable to the system, and wherein the skewed signal creates a clock signal flight time relationship between the board device and the card device, wherein the clock signal flight time relationship comprises one of substantially equal, and at least one skew.

22. A method of correlating clock signal flight times between a board device and a card device, comprising:
establishing a clock signal flight time relationship for:
a board device clock signal that propagates along a coupling between a clock driver on a board, a board device loop on a card, and a board device on the board; and
a card device clock signal that propagates along a coupling between the clock driver, a card device terminal trace on the card, and a card device on the card.

23. The method according to claim 22, wherein establishing a clock signal flight time relationship includes the following relationships:
a clock signal flight time along the board device loop and a clock signal flight time along the terminal trace, are substantially equal; and
a clock signal flight time along the card device trace is substantially equal to the sum of a clock signal flight time along the board device first trace and a clock signal flight time along the board device second trace.

24. The method according to claim 22, wherein establishing a flight time relationship includes the following relationships:
a clock signal flight time along the board device loop and a clock signal flight time along the terminal trace, are proportional; and
a clock signal flight time along the card device trace is substantially equal to the sum of a clock signal flight time along the board device first trace and a clock signal flight time along the board device second trace.

25. The method according to claim 22, wherein establishing a flight time relationship includes the following relationships:
a clock signal flight time along the board device loop and a clock signal flight time along the terminal trace, are substantially equal; and
a clock signal flight time along the card device trace is proportional to the sum of a clock signal flight time along the board device first trace and a clock signal flight time along the board device second trace.

26. The method according to claim 22, wherein establishing an effective flight time relationship includes the following relationships:
a clock signal flight time along the board device loop and a clock signal flight time along the terminal trace, are proportional; and
a clock signal flight time along the card device trace is proportional to the sum of a clock signal flight time along the board device first trace and a clock signal flight time along the board device second trace.

27. The method according to claim 22, wherein establishing a flight time relationship includes establishing a clock delay in the clock driver for the board device, wherein the clock delay establishes a board device clock signal flight time in comparison to a card device clock signal flight time that comprises one of substantially equal, and at least one skew.

28. The method according to claim 22, wherein the card device clock signal clock is one of a plurality of card device clock signals, and wherein establishing a flight time relationship includes establishing a flight time relationship for:
   a board device clock signal flight time between the clock driver and the board device; and
   at least one of the plurality of card device clock signal flight times.

29. The method according to claim 22, wherein the card device clock signal clock is one of a plurality of card device clock signals, and wherein establishing a flight time relationship includes establishing a flight time relationship for:
   a board device clock signal flight time between the clock driver and the board device; and
   the plurality of card device clock signal flight times.

* * * * *